May 25, 1937.　　　H. E. BLOMGREN　　　2,081,658
VALVE CAM OPERATION
Original Filed Oct. 22, 1932
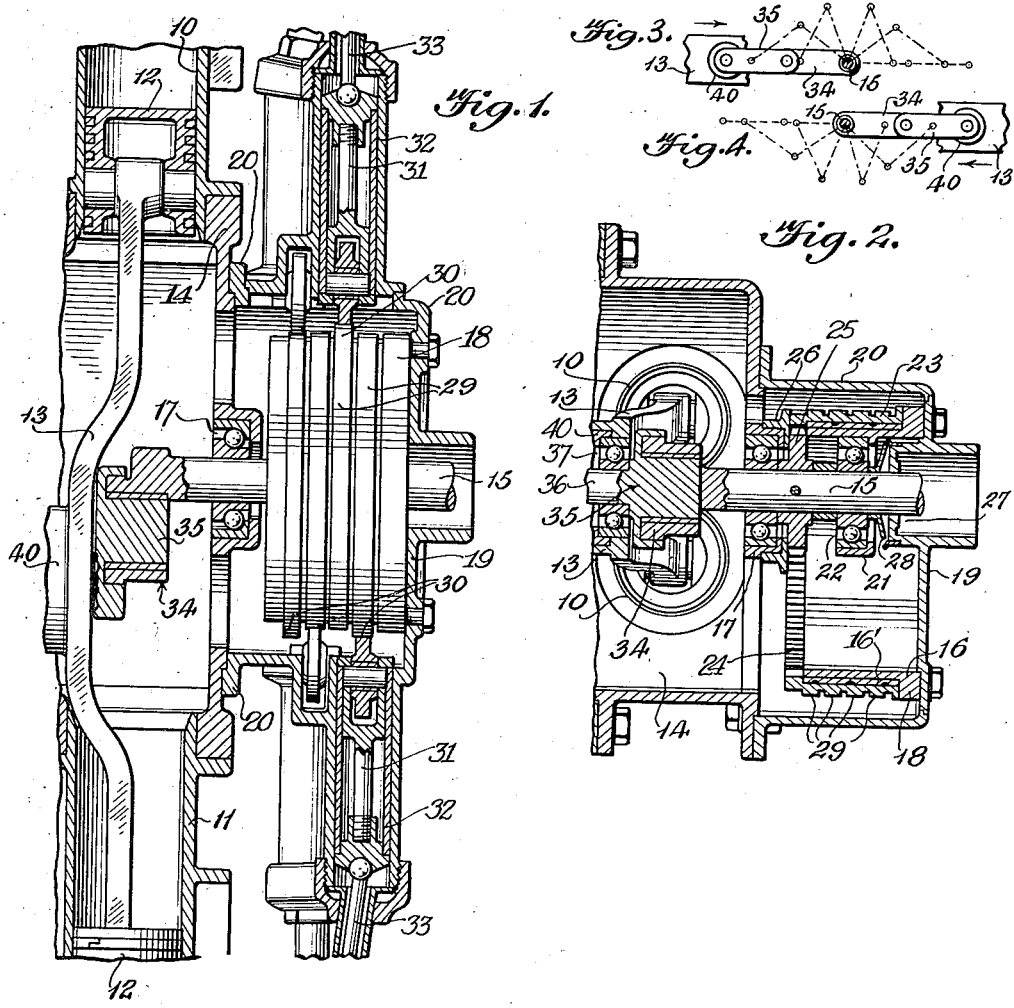
INVENTOR:
Henry E. Blomgren,
BY H. E. Woodward
ATTORNEY.

Patented May 25, 1937

2,081,658

UNITED STATES PATENT OFFICE 2,081,658

VALVE CAM OPERATION

Henry E. Blomgren, Floral Park, N. Y., assignor of one-fourth to William D. McGurn, Rockville Centre, Long Island, N. Y.

Original application October 22, 1932, Serial No. 639,055, now Patent No. 2,041,319, dated May 19, 1936. Divided and this application August 23, 1933, Serial No. 686,465

1 Claim. (Cl. 123—56)

This application is a division of my copending application Serial 639,055, filed October 22, 1932, for Internal combustion engines.

The invention relates to improved gearing and operating connections for valves, particularly poppet valves of internal combustion engines and for other uses, and has for an object to enable the embodiment of a drive and operative connection of this kind in a compact form, which will be highly durable and efficient, as well as of such simple construction that repair and replacement will be greatly facilitated.

It is a special purpose to present a novel driving means to the gearing, specially applicable where no rotating crankshaft or rotating cylinder group is involved, but only reciprocating members in the motor proper.

The invention aims to present a gearing specially applicable to motors of the type illustrated in my copending application for Letters Patent on Internal combustion motors, Ser. No. 639,055, filed October 22, 1932.

Another object is to present a gear and cam system which will be extremely quiet in operation.

Additional objects, advantages and features of invention reside in the construction, arrangement and combination of parts involved in the embodiment of the invention as will appear from the following description and accompanying drawing, wherein Figure 1 is a longitudinal sectional view of a mechanism embodying my invention in one form.

Figure 2 is a vertical cross section therethrough.

Figure 3 is a detail of the link connections of the first described form from the right hand side of Figure 1 with the cams removed, showing diagrammatically the stages of movement of the carrier 40 in one direction.

Figure 4 is a similar view showing the opposite movement of the carrier.

There is illustrated a portion of a motor which includes stationary cylinders in opposed sets 10 and 11, in which there reciprocate in unison pistons 12 between which there is connected one or more rigid connecting rods 13 having the opposed pistons connected thereto so that the connection and the opposed sets of pistons move simultaneously in the same direction. The cylinder blocks are mounted on a central case 14. On an axis intersecting at right angles the path of reciprocation of the central part of the connecting rod, there is mounted revolubly a shaft 15, located eccentrically within an annular mounting member or bearing sleeve 16 and supported by a bearing 17 carried in an extension of the case 14. The sleeve 16 is a simple cylinder with a lateral flange 18 at its outer end bolted against the head 19 of a cup-like cylindrical cam chamber or case 20 open at its inner part, spaced around the sleeve 16 suitably and having a lateral flange bolted to the case 14. The sleeve 16 is provided with an interior extension 21 in which a bearing 22 supports the shaft 15 a distance from the bearing 17. The sleeve 16 projects to within a short distance of the bearing 17, and is provided with a bushing 16' on which rotates a large cylindrical barrel cam 23, butted against the flange 18, and projecting slightly beyond the sleeve 16 at the inner end, the projecting part being formed with an internal spur gear 24, meshed with a pinion 25 fixed on the shaft 15. A spacer 26 may be confined between the cam and the mounting of the bearing 17, which will also serve as a retainer for the pinion if the latter is keyed to the shaft. The head 19 may be formed with an opening 27 through which the shaft 15 may be extended for connection with a starting means, and provided with oil retaining device 28.

The cam is formed with four external parallel cam faces 29 suitably machined to provide the lifter lobes 30. On the chamber 20 at opposite sides radial lifters 31 are slidable in tubular mountings 32, and each having a wiper roller bearing on a respective cam face 29. At their outer ends the lifters have push rods 33 connected therewith by ball and socket and extended to the valve or to rocker arms, not shown, or other valve connections may be provided. The form and relative arrangement of the cam lobes may correspond to conventional practice or be adapted to special operation.

The inner end of the shaft 15 is formed with a short throw crank arm or link 34 on which there is revoluble a link 35, revolubly mounted on the rod 13. Since the rod 13 moves across the axis of the shaft 15, the link 35 is the same length on centers as the crank 34. The mounting of the link on the rod consists of a wrist pin 36 on the link carrying the inner race of a ball bearing assembly 40 fitted in the rod 13.

For starting the motor, a crank not shown may be connected to the shaft 15, or other starting device connected to the shaft 15; and rotation of the shaft 15 will cause reciprocation of the pistons, and operation of the valves, as will be apparent, to admit and exhaust gases to and from the cylinders, as will be understood. Ignition may also be operated from the shaft 15 or otherwise as discretion dictates. The piston reciprocations will be of a length double the aggregate of the lengths of the crank and link or twice the throw of the crank arm, contrary to pitman practice. There will be two dead centers in the cycle of starting operation, and these will be overcome by momentum of the moving parts. One will occur when the crank is at the upper limit of its movement and the other when the crank is at the lower limit of movement. Approaching these points, the rod 13 will be drawn by the link and crank, but after passing these points the rod is to be propelled, with the link extended in the direction of movement of the crank instead of following it. The movement already imparted to the rod 13 will cause it to move beyond the dead center position readily, because at this position compression in opposed cylinders will be balanced and the valves will be open for scavenging in the others, involving a minimum retardance. When the charge has been ignited in one cylinder and the engine begins to operate on its own power, dead centers will occur at the ends of the stroke of the rod 13, and these will be overcome by the momentum of the cams, gears, and crank 34, as will be readily apparent. No fly-wheel action is required in this type of motor to complement the operation of the pistons, and it is an important advantage for starting, that the effectiveness of the power applied is greatly magnified at each end of the stroke of the rod, so that compression pressures are readily overcome.

I claim:

In a machine of the character described, a case, a shaft mounted therein and projecting from the case, a bearing mounted on the case, said shaft journalled in the bearing, a dome-shaped casing having an open flanged base bolted to the case around the bearing and shaft, said shaft being extended through said casing, a cylindrical large-diameter bearing sleeve on the wall of the casing opposite the case on an axis parallel to that of the shaft, a bearing within the sleeve, the outer part of said shaft journalled in the last named bearing, a barrel cam revoluble on the sleeve, projecting therebeyond toward the case, a spacer between the case and the adjacent end of the cam, said projecting part of the cam having an internal gear thereon, and a gear connection between the shaft and the internal gear; whereby unbolting of said casing will free the cam for removal, and whereby a valve operating assembly may be removably mounted as a unit on the exterior of a motor case.

HENRY E. BLOMGREN.